United States Patent [19]
Heath, Jr.

[11] 3,807,774
[45] Apr. 30, 1974

[54] LOCKING DEVICE
[75] Inventor: Joseph W. Heath, Jr., Palm Beach Gardens, Fla.
[73] Assignee: United Aircraft Corporation, East Hartford, Conn.
[22] Filed: July 10, 1972
[21] Appl. No.: 270,373

[52] U.S. Cl..................... 285/87, 285/319, 285/320
[51] Int. Cl............................................. F16l 15/00
[58] Field of Search......... 285/87, 319, 320; 151/59

[56] References Cited
UNITED STATES PATENTS
2,051,899   8/1936   Rose ...................................... 285/87
2,642,108   6/1953   Giestert ................................ 151/59
1,070,844   8/1913   Roe....................................... 285/87 X
689,763   12/1901   Taylor................................... 285/87 X FOREIGN PATENTS OR APPLICATIONS
633,010   10/1927   France ................................... 285/87

Primary Examiner—Dave W. Arola
Attorney, Agent, or Firm—Jack N. McCarthy

[57] ABSTRACT

This locking device provides means to prevent relative rotation between two co-axially threaded members by the use of a spring wire which is mounted for pivotal movement with respect to one member with means for contacting said other member for fixing the two members with respect to one another, and means for locking the spring wire in place.

13 Claims, 3 Drawing Figures

PATENTED APR 30 1974 3,807,774
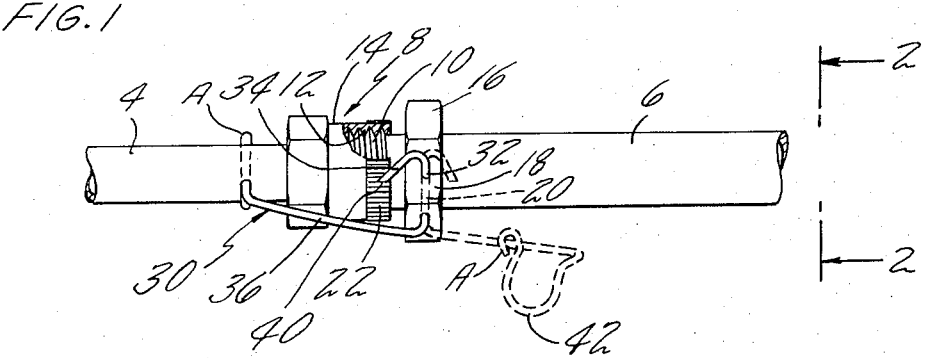
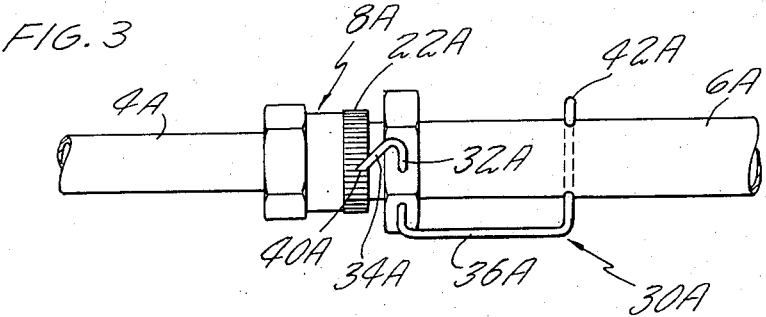
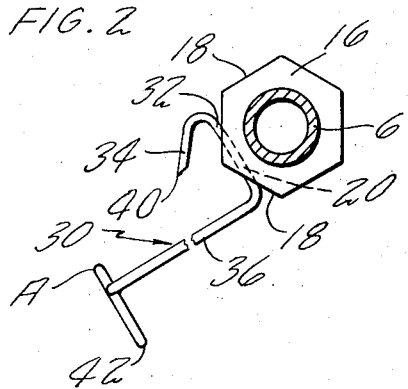

LOCKING DEVICE

BACKGROUND OF THE INVENTION

This invention relates to safety devices for fixing one member with respect to another against relative rotation. Two examples are shown in the patent to Rose, U.S. Pat. No. 2,051,899 and the patent to Geistert, U.S. Pat. No. 2,642,108.

SUMMARY OF INVENTION

The primary object of this invention is to provide a reusable locking device for tube fittings wherein a fitting is rotated for installation or removal.

In accordance with the present invention a spring wire is pivotally mounted on one part and arranged to have one end engage another part by spring action for locking.

BRIEF DESCRIPTION OF THE DRAWINGS

FIG. 1 is a perspective view of a locking means including the invention applied to two members having relative movement therebetween.

FIG. 2 is a view taken on the line 2—2 of FIG. 1 showing the locking means 90° from its locked position.

FIG. 3 is a modification of the locking means shown in FIG. 1.

DESCRIPTION OF THE PREFERRED EMBODIMENTS

As shown in FIG. 1, two co-axially aligned pipe sections 4 and 6 are shown fixed together by a connecting means 8. The connecting means 8 comprises an externally threaded portion 10 formed on the pipe section 6 and a mating internally threaded portion 12 located on the end of the pipe section 4. This threaded portion 12 can be formed in a member 14 fixed to the pipe section 4 or mounted thereon for rotation therewith.

If the member 14 is mounted on the pipe section for relative rotation, means are provided to retain the member 14 on the pipe section and seal means can be employed to prevent leakage.

A flange member 16 projects outwardly from the pipe section 6 adjacent the end of the externally threaded portion 10. This flange member 16 is formed as a hexagonal nut with six (6) sides 18. An opening 20 extends from one side 18 through to an adjacent side. The axis of said opening being in a plane which is at right angles to the axis of the said pipe sections 4 and 6. The end of the member 14 adjacent the flange member 16 is of cylindrical shape and has a plurality of serrations 22 located around its entire periphery. The end of said member 14 located away from the flange member 16 is formed as a hexagonal nut. When it is desired to rotate the member 14 with respect to the flange member 16, sides of the hexagonal nuts can be held to provide a tightening or loosening movement.

For locking the member 14 on the pipe section 6, a locking member 30 is used. Locking member 30 comprises a spring steel wire formed having a straight section 32 passing through the opening 20, a short section 34 extending from one end of the straight section 32 and a long section 36 extending from the other end of the straight section. The straight section 32 is permitted rotation within the opening 20 and it is about this section which sections 34 and 36 rotate to perform their locking and unlocking action.

The free end of the short section 34 has an edge 40 for engaging the serrations 22, and the free end of the long section 36 has a curved section 42 for encircling the pipe section 4 when the edge 40 is in engagement with the serrations. Said short section 34 and long section 36 being at such an angle to the straight section 32 that as the locking member 30 is rotated from the dotted position in FIG. 1, about the straight section 32, to the position shown in full lines, the edge 40 engages these serrations prior to the open part of the curved section 42 being positioned adjacent the pipe section 4 so that the curved section 42 can be placed thereon. This provides for the long section 36 being placed in a position whereby a spring force is always applied to keep the edge 40 in engagement with the serrations 22.

If desired, the short section 34 can have the edge 40 angled with respect to the serrations so that the member 14 can be moved in a direction tightening the threaded portions 10 and 12 by the use of a large force. Movement in a loosening direction is prevented using the same size force.

As the locking member 30 is rotated from the dotted position in FIG. 1 to the position shown in full lines, the end A of the curved section 42 engages the pipe section 4. The curved section 42 is then sprung downwardly and outwardly until the end A passes under pipe section 4 to the other side thereof. The curved section 42 is then pressed onto the pipe section 4 where it is held thereon by a snug fit. At this point the spring force acts to hold the curved section 42 on the pipe section 4, in addition to the snug fit, to keep the edge 40 in engagement with the serrations 22. While said locking member 30 has been described as made of spring steel, other materials having similar properties can be used.

As shown in FIG. 3 the two co-axially aligned pipe sections 4A and 6A are fixed together by the same type connecting means 8A as shown in FIG. 1. The locking member 30A while having the same straight section 32A and short section 34A, the long section 36A is formed extending in an opposite direction from the short section 34A. The straight section 32A is also permitted rotation within the opening and it is about this section which sections 34A and 36A rotate to perform their locking and unlocking action. In FIG. 3 as the locking member 30A is rotated about the straight section 32A, the short section 34A moves outwardly from the figure while the long section 36A moves backwardly from the figure. The short section 34A and long section 36A being at such an angle to the straight section 32A that as the locking member is rotated to the position shown in FIG. 3, the edge 40A on the short section 34A engages the serrations 22A prior to the curved section 42A reaching the pipe section 4. After the edge 40A has engaged the serrations 22A the curved section 42A is then pressed onto the pipe section 6A, having a snug fit therewith. The long section 36A places a spring force on the edge 40A to keep it in engagement with the serrations 22A.

I claim:

1. A device for locking a first member against rotation with respect to a second member, said second member having a projection thereon, said first member having a cylindrical outer section, said cylindrical section being mounted on said projection for rotation therewith, said cylindrical section having serrations on its outer surface, a locking member having an intermediate straight section on said second member, means pivotally mounting said intermediate straight section on said second member, a first arm extending from one end of the intermediate straight section of the locking member, said arm having an edge for engaging said serrations in its locked position for preventing movement between said first and second member, said locking member having a second arm means extending from the other end of said intermediate straight section for engaging a member fixed against radial movement with respect to said cylindrical section in its locked position for maintaining said edge in engagement with said serrations, said second arm means providing a spring action to continually bias said edge against said serrations.

2. A device as set forth in claim 1 wherein said mounting means includes a flange member extending outwardly from said second member adjacent said projection and the intermediate straight section of the locking member is pivotally mounted to the flange member.

3. A device as set forth in claim 1 wherein said projection is a tubular member having external threads thereon and said cylindrical outer section has internal threads for engaging said external threads.

4. A device as set forth in claim 1 wherein said locking member is a wire member, said mounting means for said intermediate straight section of said wire member including an opening through said second member.

5. In combination, a first tubular means, a second tubular means, said first tubular means having external threads adjacent one end thereof, said second tubular means having internal threads for engaging said external threads, said second tubular means having a cylindrical outer surface containing serrations thereon, a locking member having an intermediate straight section, means pivotally mounting said intermediate straight section on said first tubular means for locking said first tubular means to said second tubular means, said locking member having a first arm extending from one end of the intermediate straight section with an edge for engaging said serrations in a locking position for preventing movement between said first and second tubular means, said locking member having a second arm means extending from the other end of the intermediate straight section for engaging one of said tubular means in a locking position for maintaining said edge in engagement with said serrations, said second arm means providing a spring action to continually bias said edge against said serrations.

6. A combination as set forth in claim 5 wherein said locking member is a wire member, said mounting means for said intermediate straight section of said wire member including an opening through said first tubular means.

7. A combination as set forth in claim 5 wherein the free end of said second arm means has a curved section for encircling the second tubular means.

8. A combination as set forth in claim 5 wherein said second arm means engages said first tubular means in a locking position for maintaining said edge in engagement with said serrations.

9. A device as set forth in claim 1 wherein said second arm means also provides a spring action to continually bias said second arm against a member fixed against radial movement with respect to said cylindrical section.

10. A combination as set forth in claim 5 wherein said second arm means also provides a spring action to continually bias said second arm against said one of said tubular means.

11. A combination as set forth in claim 5 wherein the axis of rotation of said intermediate straight section is located toward one side of the first tubular means.

12. A combination as set forth in claim 11 wherein said second arm means has a curved section, said curved section encircling said second tubular means on a side away from the pivotal mounting of the locking member.

13. A combination as set forth in claim 3 wherein said first arm extends at an angle from said intermediate straight section towards said serrations so that the threads on the tubular member and cylindrical outer section can be tightened by a large force while movement in a loosening direction is prevented using the same size force.

* * * * *